United States Patent
Anderson et al.

(10) Patent No.: US 7,702,038 B2
(45) Date of Patent: Apr. 20, 2010

(54) RADIO FREQUENCY (RF) RECEIVER WITH AMPLITUDE-SHIFTED KEYING/FREQUENCY-SHIFTED KEYING (ASK/FSK) DUTY CYCLE OPTIMIZATION ALGORITHM

(75) Inventors: John R. Anderson, White Lake, MI (US); Wayne Wang, Rochester Hills, MI (US)

(73) Assignee: Continental Automotive Systems US, Inc., Auburn Hills ( * ) Notice: Subject to any disclaimer, the term of this patent is extended or adjusted under 35 U.S.C. 154(b) by 863 days.

(21) Appl. No.: 11/517,001

(22) Filed: Sep. 7, 2006

(65) Prior Publication Data

US 2007/0064838 A1 Mar. 22, 2007

Related U.S. Application Data

(60) Provisional application No. 60/718,208, filed on Sep. 16, 2005.

(51) Int. Cl.
*H03K 9/06* (2006.01)
(52) U.S. Cl. .................. 375/322; 375/320; 375/334; 375/223; 375/272; 375/303; 329/315; 331/179
(58) Field of Classification Search .............. 375/322, 375/320, 334, 223, 272, 303; 329/315; 331/179
See application file for complete search history.

(56) References Cited

U.S. PATENT DOCUMENTS 6,650,236 B2 * 11/2003 Ghabra et al. .............. 340/447
6,839,792 B2 * 1/2005 Feldstein et al. ........... 710/306
7,050,508 B2 * 5/2006 Sorrells et al. ............. 375/259
7,305,225 B2 * 12/2007 Benz et al. ................. 455/345
2002/0149477 A1 * 10/2002 Desai et al. ................ 340/442
2002/0177406 A1 * 11/2002 O'Connor et al. ............. 455/39
2003/0122660 A1 * 7/2003 Kachouh et al. ........... 340/442
2004/0124912 A1 * 7/2004 Desai et al. ................ 329/347
2005/0003781 A1 * 1/2005 Kunz et al. ............. 455/226.1
2005/0162259 A1 * 7/2005 Hotta et al. ............ 340/426.13
2005/0232376 A1 * 10/2005 Liem et al. ................. 375/322
2006/0139158 A1 * 6/2006 Miller et al. ............... 340/445
2008/0024287 A1 * 1/2008 Boyle et al. ............... 340/442

FOREIGN PATENT DOCUMENTS

EP 1 187 346 3/2002
WO WO 02/093857 11/2002

OTHER PUBLICATIONS

International Search Report dated Jan. 16, 2007.

* cited by examiner

*Primary Examiner*—Juan A Torres

(57) ABSTRACT

A radio frequency (RF) receiver for receiving transmissions of different modulations includes cycling between a first mode for receiving transmissions of a first modulation that occurs frequently and a second mode for receiving transmission of a second modulation that occurs infrequently. The example RF receiver is cycled between a first modulation for receiving a frequency shift keyed (FSK) transmission from a tire pressure monitoring (TPM) system and a second modulation for receiving an amplitude shift keyed (ASK) transmission from a remote keyless entry (RKE) system. The RF receiver cycles between different modulations to detect the most frequent FSK modulated transmissions while also detecting and receiving the relatively infrequent ASK modulated RKE transmissions without an undesirable delay.

14 Claims, 3 Drawing Sheets

RADIO FREQUENCY (RF) RECEIVER WITH AMPLITUDE-SHIFTED KEYING/FREQUENCY-SHIFTED KEYING (ASK/FSK) DUTY CYCLE OPTIMIZATION ALGORITHM

CROSS REFERENCE TO RELATED APPLICATION

The application claims priority to U.S. Provisional Application No. 60/718,208 which was filed on Sep. 16, 2005.

BACKGROUND OF THE INVENTION

This invention generally relates to a method and system for receiving multiple signals with a single receiver. More particularly, this invention relates to a method of operating a radio frequency (RF) receiver for an automobile to receive signals from multiple systems and modulations.

Increasing numbers of systems installed within an automobile utilize radio frequency communication protocols. For example, nearly all vehicles include a remote entry system that sends a signal that is received by an RF receiver within the vehicle to actuate door and trunk locks. Additionally, the same vehicle may include a tire pressure monitoring system including a sensor in each tire that transmits a signal indicative of current tire conditions.

In addition to the multiple signals from multiple sources, each of the signals is typically transmitted in different modulations that are selected according to characteristics of origins and characteristics of the data transmitted. Accordingly, the RF receiver is programmed to receive different signal modulations. Some signals have priority over other signals in specific circumstances. For example, when an automobile is parked, a remote keyless entry signal may be of increased priority as compared to a signal representing conditions within a tire. Although during operation of the vehicle, the signals from the tire pressure monitoring system would be of increased importance.

Another concern is to ensure that the signal with the current highest priority is received according to desired criteria to provide the desired performance. In some instances, merely cycling the RF receiver to look for each different modulation of signal in turn can result in missing a priority signal for an undesirable length of time. As appreciated such operation can result in unfavorable operation.

Accordingly, there is a need for an RF receiver and method of operating an RF receiver that provides for the receipt of multiple signals of different modulations that receives all signals to prevent delay of any operation for each vehicle system.

SUMMARY OF THE INVENTION

An example method of operating an RF receiver for receiving transmissions of different modulations includes the step of cycling between a first mode for receiving transmissions of a first modulation that occurs frequently and a second mode for receiving transmission of a second modulation that occurs infrequently.

An example RF receiver receives transmissions for a remote keyless entry (RKE) system and a tire pressure monitoring (TPM) system. The RKE system includes a transmitter commonly referred to as a key fob that emits a transmission that is received by the RF receiver. The example RF receiver is cycled between a first modulation for receiving the FSK transmission from the TPM system and a second modulation for receiving the ASK transmission from the RKE system. The RF receiver cycle includes a short duration where the RF receiver searches for ASK modulated transmissions followed by a switch to the first modulation where it is set to receive an FSK modulated signal.

The duration that the RF receiver is in the ASK mode is of a duration determined to detect, but not necessarily receive an entire ASK modulated transmission. The duration that the RF receiver is in the ASK mode is such that some part of a first transmission from the RKE transmitter will be received. The receipt of this first transmission from the RKE transmitter prompts the RF transmitter to prepare for receiving the second subsequent RKE transmission. If no ASK modulated transmission is detected, the RF receiver will return to the first FSK mode.

The RF receiver is therefore operated according to the example method to cycle between different modulations to detect the most frequent FSK modulated transmissions while also detecting and receiving the relatively infrequent ASK modulated RKE transmissions without an undesirable delay.

These and other features of the present invention can be best understood from the following specification and drawings, the following of which is a brief description.

DETAILED DESCRIPTION OF THE PREFERRED EMBODIMENT

Figure 1:
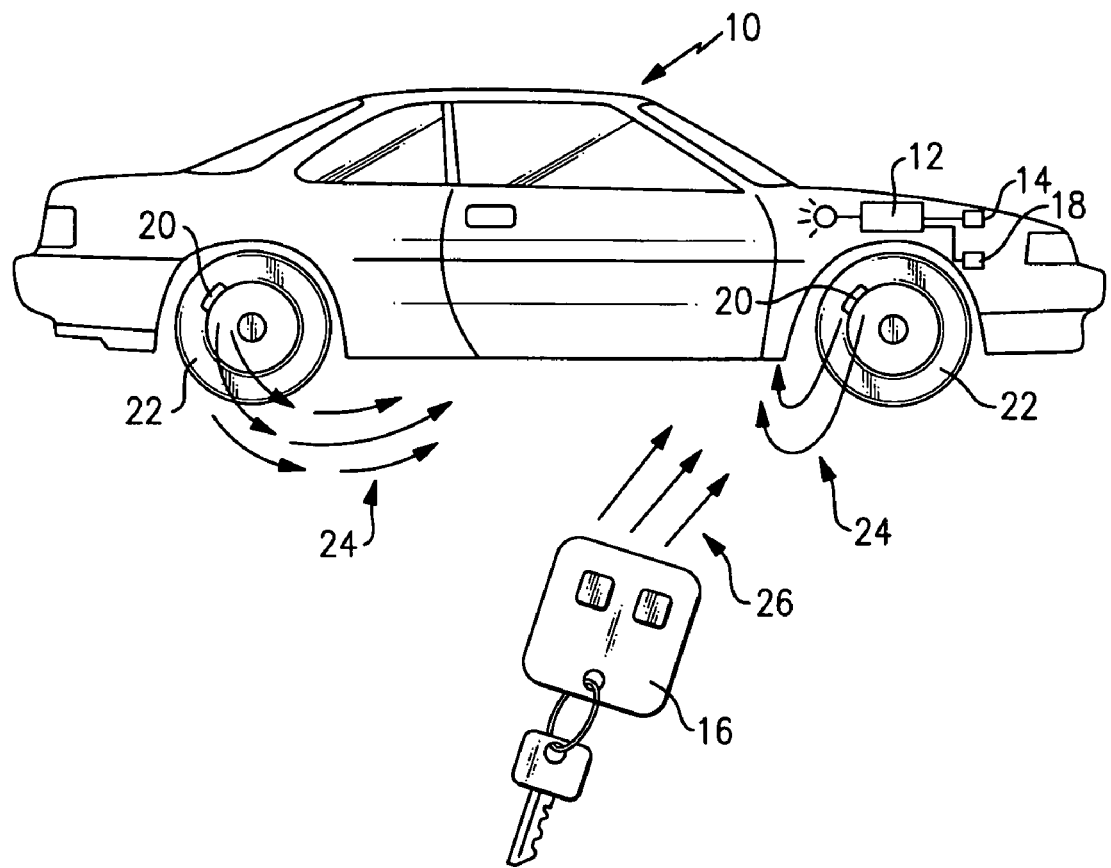
FIG. 1 is a schematic view of a vehicle including a remote keyless entry system and a tire pressure monitoring system.

Referring to FIG. 1, a vehicle 10 includes a RF receiver 12 for receiving transmissions for a remote keyless entry (RKE) system 14 and a tire pressure monitoring (TPM) system 18. The RKE system 14 includes a transmitter commonly referred to as a key fob 16 that emits a transmission 26 that is received by the RF receiver 12. The TPM system 18 includes a sensor 20 in each tire 22. The sensors 20 emit transmissions 24 that communicate conditions within each of the tires 22.

The RF receiver 12 receives both the RKE transmission 26 and the TPM transmission 24. The RF receiver 12 then communicates information from the transmissions 24, 26 to one of the RKE system 14 and the TPM system 18. The RF receiver 12 is capable of operating to receive signals of one modulation mode at any one time. The RKE transmissions 26 are modulated according to an Amplitude Shift Keyed (ASK) modulation and the TPM transmissions 24 are modulated according to a Frequency Shift Keyed (FSK) modulation.

The RKE transmission 26 is transmitted in identical data packets that are spaced at fixed intervals in response to actuation of the transmitter 16. The TPM transmissions 24 are transmitted in several data packets that are spaced apart at variable intervals dependent on vehicle operation characteristics. Operation of the RKE system 14 occurs infrequently as compared to the operation and transmissions from the TPM sensors 20. However, it is desired that the RKE transmissions 26 be received no matter what other operations are occurring. The RKE transmissions 26 prompt opening of vehicle doors or other enclosures to allow entry to the vehicle, therefore any delay in receiving an RKE transmission is undesirable.

Figure 2:
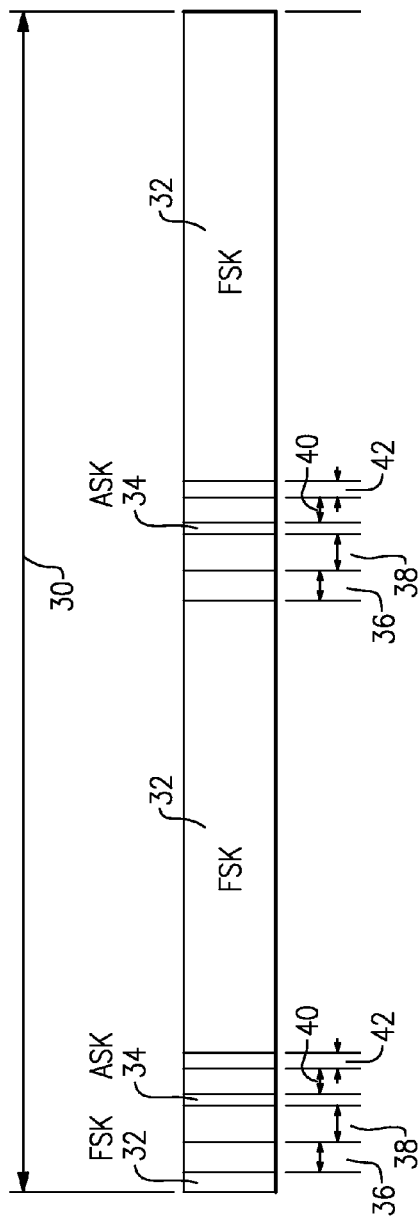
FIG. 2 is a schematic view of an example cycle for a RF receiver.

Referring to FIG. 2, the example RF receiver 12 is cycled between a first modulation for receiving the FSK transmission from the TPM system 18 and a second modulation for receiving the ASK transmission from the RKE system 14. The RF receiver cycle 30 includes a short duration where the RF receiver 12 searches for ASK modulated transmissions followed by a switch to the first modulation where it is set to receive an FSK modulated signal. The example cycle 30 is 30 ms long and begins with the RF receiver set in a first FSK mode indicated at 32. The RF receiver 12 is then switched from the first FSK mode 32 to the second ASK mode indicated at 34. The switch includes a period 36 for switching from the FSK mode 32 to the ASK mode 34. Once switched to the ASK mode 34, there is a small delay for the RF receiver 12 to settle as indicated at 38 and then the RF receiver operates in ASK mode 34 to detect any ASK transmissions.

The duration that the RF receiver 12 is in the ASK mode 34 is of a duration determined to detect, but not necessarily receive an entire ASK modulated transmission 26. The duration that the RF receiver 12 is in the ASK mode 34 is such that some part of a first transmission from the RKE transmitter 16 will be received. The receipt of this first transmission from the RKE transmitter 16 prompts the RF receiver 12 to prepare for receiving the second subsequent RKE transmission 26.

The example RF receiver 12 will than remain in the second ASK mode to receive the ASK modulated transmission until that transmission is received. Additionally, the example RF receiver 12 is prompted to return to the FSK mode 32 and then return to the ASK mode 34 in time to receive the ASK modulated RKE transmission 26. As the interval between ASK transmissions and data packets is fixed, the RF receiver 12 is switched to be ready for receipt of the second subsequent ASK modulated RKE transmission.

If no ASK modulated transmission is detected, the RF receiver will return to the first FSK mode 32. The switch includes a switch from ASK modulation to FSK modulation indicated at 40 followed by a settle period 42 in which the RF receiver 12 settles into the FSK mode 32. The example receiver 32 remains in the FSK mode 32 for a duration of approximately 12 ms. The duration that the RF receiver 12 is in FSK mode 32 is determined to provide sufficient time to receive incoming TPM transmissions 24. The process is then repeated by switching the RF receiver 12 back to the second ASK mode 34.

Figure 3:
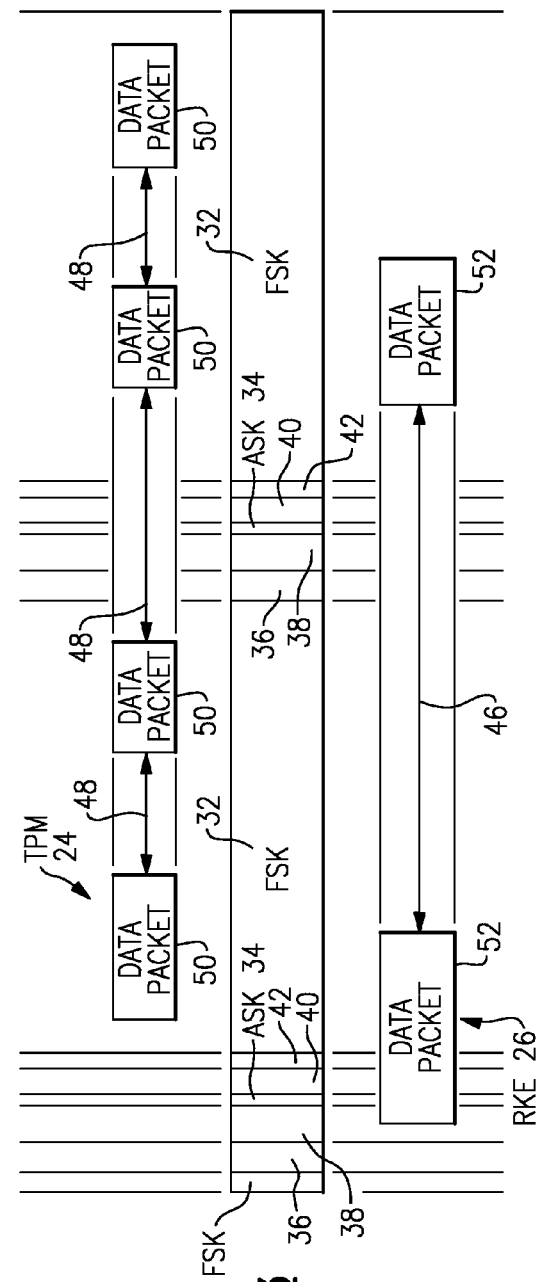
FIG. 3 is a schematic view illustrating example operation of the example RF receiver.

Referring to FIG. 3, an example operation cycle schematically illustrates the TPM transmission 24 and the RKE transmission 26, along with the example duty cycle 30 of the RF receiver 12. The RF receiver 12 cycles between the first FSK mode 32 and the second ASK mode 34 such that a first data packet 52 of the RKE transmission 26 is detected at least in part. Once the first RKE data packet 52 is detected, the second subsequent data packet will follow at a known fixed interval 46. The RF receiver 12 can therefore be switched back to the first FSK mode to receive any TPM transmissions 24 in the interval 46 between data packets 52 or can be operated to remain in the ASK mode 32 until the second data packet 52 is received. In any operation, the RF receiver 12 is operated to receive in full the second data packet 52 from the RKE transmitter 16.

In most instances, operation of in the ASK mode 32 will not result in detection of an RKE transmission 26, and therefore switch back to receive the TPM transmission 24. The TPM transmission 24 includes data packets 50 that are transmitted at intervals 48. The intervals 48 are not fixed as each transmission and data packet from the TPM system 18 is transmitted according to vehicle operating characteristics. The intervals 48 vary according to conditions within the tire 20. As appreciated, an example TPM sensor 20 may transmit at an increased frequency if the conditions in the tire 22 meet certain criteria such as when a low pressure condition is detected.

During typical example operation of the RF receiver 12 the RKE transmission 26 will occur only a few times a day, where transmission of signals from the TPM system 18 will occur more frequently with operation of the vehicle.

Figure 4:
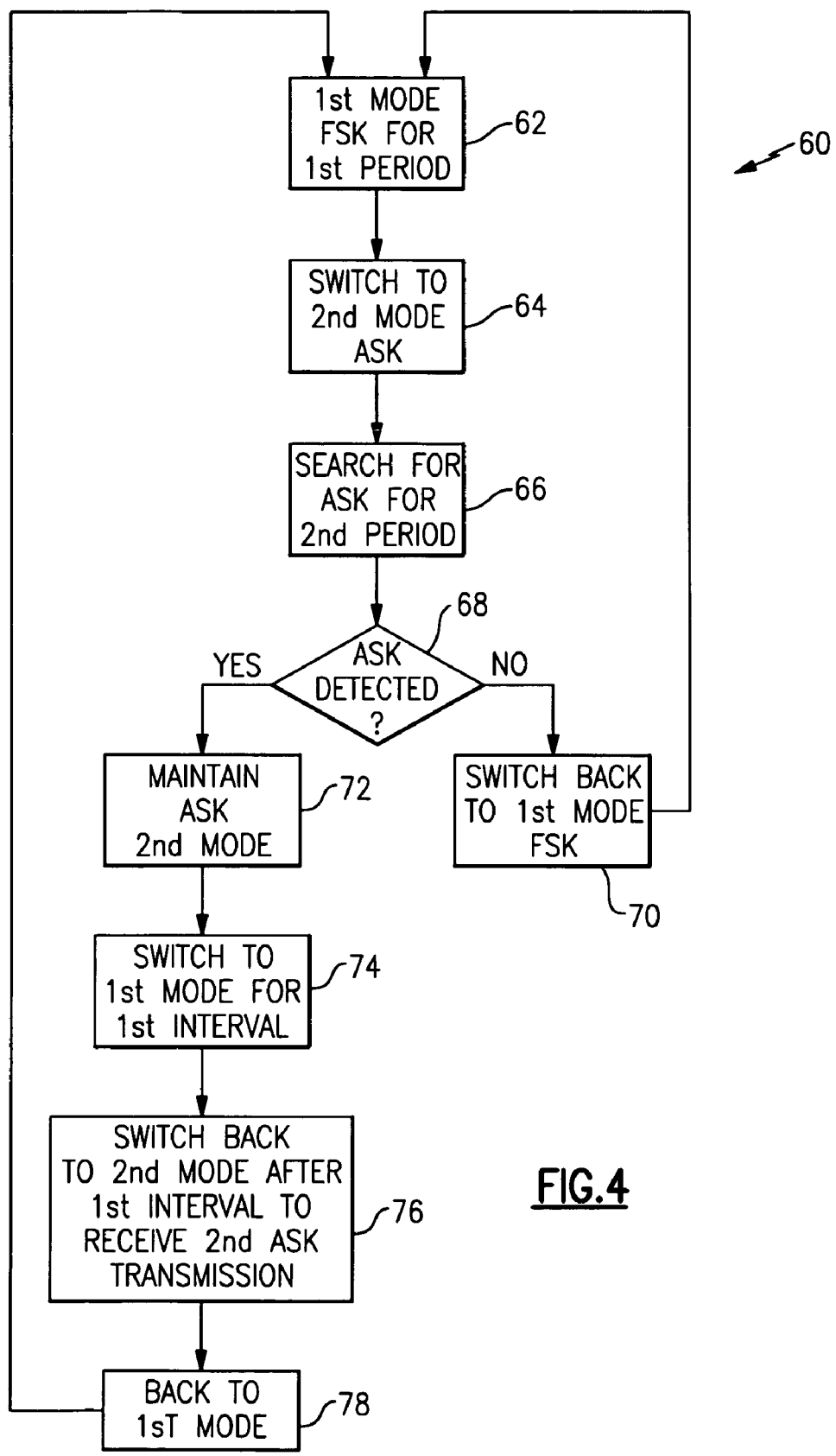
FIG. 4 is a schematic view illustrating example method steps for operating an RF receiver.

Referring to FIG. 4, the example RF receiver 12 is operated by cycling between the first FSK mode 32 and the second ASK mode 34. An example operation of the RF receiver 12 is generally indicated and schematically shown at 60 and begins with operation in the first FSK mode 32 as indicated at 62. The RF receiver 12 is then switched from the first FSK mode 32 to the second ASK mode 34 as is indicated at 64. The RF receiver 12 searches for an ASK transmission 26 as is indicated at 66. As transmissions from the RKE system 14 will be infrequent, the RF receiver 12 remains in the second ASK mode 34 for a period that provides for the detection of a first ASK transmission, but not necessarily the entire transmission. If no ASK transmission is detected, the RF receiver 12 is switched back to the first mode 32 to receive FSK modulated transmissions as is indicated at 70.

Upon detection of an ASK transmission as indicated at 68, the RF receiver 12 is maintained in the second ASK mode as indicated at 72. The RF receiver 12 can then be switched back to the first mode 32 as is indicated at 74 upon the completion of the first ASK transmission. Because the ASK transmissions occur at a fixed frequency, the time at which the second subsequent ASK transmission is known. Therefore, the RF transmitter 12 can be switched to the first mode to receive FSK signals in the interval between subsequent ASK signals. The RF receiver 12 is then switched back to the second mode to receive the second subsequent ASK modulated RKE transmission as is indicated at 76. The RF receiver 12 can also be operated by maintaining the second mode until the second subsequent ASK signal is received.

Once the second subsequent ASK modulated RKE transmission is received, the RF receiver 12 is switched back to the first mode to receive FSK modulated TPM transmissions as indicated at 78.

The RF receiver 12 is therefore operated according to the example method to cycle between different modulations to detect the most frequent FSK modulated transmissions while also detecting and receiving the relatively infrequent ASK modulated RKE transmissions without an undesirable delay.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of operating a radio frequency (RF) receiver for an automobile comprising the steps of:

operating the RF receiver in a first mode for receiving Frequency Shift Keyed (FSK) modulated transmissions for a first period;

switching the RF receiver to a second mode for receiving an Amplitude Shift Keyed (ASK) modulated transmission for a second period, shorter than the first period;

switching the RF receiver back to the first mode responsive to the RF receiver determining that an ASK modulated transmissions is present;

switching the RF receiver back to the second mode after a first known time interval such that the RF receiver can receive a second ASK modulated transmission; and maintaining the RF receiver in the second mode after the first known time interval to received the second ASK modulated transmission.

2. The method as recited in claim 1, wherein the second period is of a duration determined to detect the presence of the first ASK modulated transmission and shorter than a period required to receive the entire first ASK modulated transmission, such that receipt of the first ASK modulated transmission in the second period provides a prompt for the RF receiver to operate in the second mode to receive a second ASK modulated transmission.

3. The method as recited in claim 2, wherein a first time interval between the first ASK modulated transmission and the second ASK modulated transmission is fixed.

4. The method as recited in claim 3, wherein the first period is of a duration shorter than the first time interval between the first ASK modulated transmission and the second ASK modulated transmission.

5. The method as recited in claim 1, wherein a second time interval between receiving a first FSK modulated transmission and a second FSK modulated transmission is variable.

6. The method as recited in claim 1, wherein the ASK modulated transmission is transmitted for a remote keyless entry (RKE) system and includes several identical packets of data transmitted at fixed intervals.

7. The method as recited in claim 1, wherein the FSK modulated transmission is transmitted for a tire pressure monitoring (TPM) system and includes several identical packets of data transmitted at variable intervals.

8. The method as recited in claim 7, wherein the variable intervals between the several data packets varies responsive to detected operating condition of the automobile.

9. A method of operating an RF receiver for an automobile comprising the steps of:
   a) operating the RF receiver in a first mode for receiving Frequency Shift Keyed (FSK) modulated transmissions for a first period:
   b) switching the RF receiver to a second mode for receiving an Amplitude Shift Keyed (ASK) modulated transmission for a second period, shorter than the first period, wherein the second period is of a duration determined to detect the presence of the first ASK modulated transmission and shorter than a period required to receive the entire first ASK modulated transmission such that receipt of the first ASK modulated transmission in the second period provides a prompt for the RF receiver to operate in the second mode to receive a second ASK modulated transmission;
   c) switching the RF receiver back to the first mode responsive to the RF receiver determining that no ASK modulated transmissions is present; and
   d) maintaining the RF receiver in the second mode responsive to a first ASK modulated transmission being detected, wherein a first time interval between the first ASK modulated transmission and the second ASK modulated transmission is fixed and RF receiver switches back to operate in the first mode responsive to receiving the first ASK modulated signal until the first time interval expires where the RF receiver switches back to the second mode to receives the second ASK Modulated signal.

10. A method of receiving transmissions from a tire pressure monitoring (TPM) system and a remote keyless entry (RKE) system with one RF receiver comprising the steps of:
   operating the RF receiver in a first mode for receiving a Frequency Shift Keyed (FSK) modulated transmission from the TPM system for a first period;
   switching the RF receiver to a second mode for receiving an Amplitude Shift Keyed (ASK) modulated transmission from the RKE system for a second period shorter than the first period and shorter than the ASK modulated transmission;
   searching for an ASK modulated transmission; and
   switching the RF receiver back to the first mode responsive to no ASK modulated transmission being detected, and prompting the RF receiver to switch into the second mode after a first known time interval for receiving a second ASK modulated signal responsive to receiving a first ASK modulated transmission during the second period.

11. The method as recited in claim 10, including the step of determining the time at which the second ASK transmission is expected responsive to receiving the first ASK transmission.

12. The method as recited in claim 11, wherein a first interval between the first ASK transmission and the second ASK transmission is fixed.

13. The method as recited in claim 10, wherein a second interval between a first FSK modulated transmission and a second FSK modulated transmission is variable.

14. The method as recited in claim 10, wherein the second period is shorter than the first period and shorter than a duration of the first and second ASK modulated transmissions.

* * * * *